United States Patent [19]

Schmidt et al.

[11] Patent Number: 5,237,046
[45] Date of Patent: Aug. 17, 1993

[54] PROCESS FOR STABILIZING THE MOLECULAR WEIGHT OF LINEAR OR OPTIONALLY BRANCHED POLYARYLENE SULFIDES

[75] Inventors: Manfred Schmidt, Krefeld, Fed. Rep. of Germany; Gabriel Denecker, Kalmthout, Belgium; Wolfgang Jakob, Moers; Wolfgang Arlt, Krefeld, both of Fed. Rep. of Germany

[73] Assignee: Bayer Aktiengesellschaft, Leverkusen, Fed. Rep. of Germany

[21] Appl. No.: 844,211

[22] Filed: Mar. 2, 1992

[30] Foreign Application Priority Data

Mar. 13, 1991 [DE] Fed. Rep. of Germany ....... 4108033

[51] Int. Cl.$^5$ ............................................. C08G 75/16
[52] U.S. Cl. ....................................... 528/388; 528/86; 528/226; 528/271; 528/486; 528/487
[58] Field of Search ................. 528/388, 86, 226, 271, 528/486, 487

[56] References Cited

U.S. PATENT DOCUMENTS

| | | | |
|---|---|---|---|
| 3,783,138 | 1/1974 | Miles et al. | 528/388 |
| 4,656,231 | 4/1987 | Tieszen et al. | 525/537 |
| 4,877,850 | 10/1989 | Geibel et al. | 528/388 |
| 4,920,201 | 4/1990 | Jakob et al. | 528/486 |

*Primary Examiner*—Harold D. Anderson
*Attorney, Agent, or Firm*—Connolly and Hutz

[57] ABSTRACT

The invention relates to a process for stabilizing the molecular weight of high molecular weight, optionally branched polyarylene sulfides prepared by reaction of aromatic dihalogen compounds and, optionally, aromatic trihalogen or tetrahalogen compounds and, optionally, polymer-chain-terminating monomers with alkali metal sulfides and/or alkali metal hydrogen sulfides at elevated temperature in aprotic polar solvents, characterized in that, after the desired molecular weight has been reached, alkali metal sulfides and/or alkali metal hydrogen sulfides present in excess are at least partly reacted with acids to form the alkali metal salts of the acids and hydrogen sulfide.

16 Claims, No Drawings

PROCESS FOR STABILIZING THE MOLECULAR WEIGHT OF LINEAR OR OPTIONALLY BRANCHED POLYARYLENE SULFIDES

This invention relates to a process for stabilizing the molecular weight of high molecular weight, optionally branched polyarylene sulfides prepared by reaction of aromatic dihalogen compounds and, optionally, aromatic trihalogen or tetrahalogen compounds and, optionally, polymer-chain-terminating monomers with alkali metal sulfides and/or alkali metal hydrogen sulfides at elevated temperature in aprotic polar solvents, characterized in that, after the desired molecular weight has been reached, alkali metal sulfides and/or alkali metal hydrogen sulfides present in excess are at least partly reacted with acids to form the alkali metal salts of the acids and hydrogen sulfide.

Polyarylene sulfides (PAS) and their production are known (cf. for example U.S. patent application 3,354,129, EP-A 171 021, 0 215 259, 0 142 024, DE-A 3 839 441, DE-A 2 623 362).

PAS are high-temperature-resistant plastics. They are used mainly in the electrical and electronics field and in vehicle and aircraft construction. Applications such as these impose stringent demands on the purity and stability and, hence, on the molecular weight uniformity of a plastic.

The polyarylene sulfides formed from aromatic dihalogen compounds and alkali metal sulfides with elimination of alkali metal halides can react with excess alkali metal sulfides at elevated temperature with cleavage of the polymer chain, resulting in unwanted reductions in molecular weight (for example N. N. Woroschzow et al, C.R. Acad. Sci. URSS Ser. A, 1933, pages 291–95, Leningrad Inst. for High Pressures). This can lead to polyarylene sulfides of low molecular weight which have relatively high melt flow values. DE-A 2 623 362 describes a process in which polyarylene sulfides are produced in N-methyl pyrrolidone with addition of large quantities of polymerization aids, such as lithium halides or alkali metal carboxylates, carbon dioxide being added to the reaction mixture during or after formation of the polymer. Polymers having high melt flow values are obtained by this process. The object of this process according to DE-A 2 623 362 is intentionally to obtain polyarylene sulfides having low molecular weights, i.e. melt flow values.

The object of the process according to the present invention is to produce polyarylene sulfides having a defined molecular weight and to stabilize the molecular weight in the reaction mixture in such a way that there is no reduction in molecular weight for a prolonged period, which is necessary for working up an industrial batch having an overall weight of several tonnes, and polyarylene sulfides having a certain molecular weight uniformity are obtained.

The present invention relates to a process for the molecular weight stabilization of linear or optionally branched polyarylene sulfides, preferably polyphenylene sulfides, prepared by reaction of a) one or more (hetero)aromatic dihalogen compounds corresponding to formula (I) and/or (II)

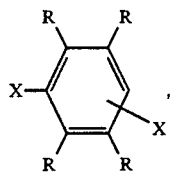 (I)

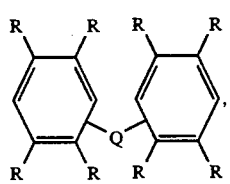 (II)

in which

X represents halogen, such as chlorine or bromine, the R's may be the same or different and represent hydrogen, $C_{1-20}$ alkyl, $C_{4-20}$ cycloalkyl, $C_{6-24}$ aryl, $C_{7-24}$ alkylaryl and $C_{7-24}$ arylalkyl; two substituents R in the ortho position to one another may be attached to form an aromatic or heterocyclic ring containing up to 3 hetero atoms, such as N, O or S, and Q is a chemical bond, two-bond groups, such as —Ar—, —O—, —S—, —SO—, —SO$_2$—, —(Cr$_2$)$_m$—, —CO—, —CO—Ar—CO—, —CO—NH—, —CO—NH—Ar—NH—CO—, where R is as defined above, Ar is a two-bond $C_{6-24}$ aromatic radical and m is an integer of 1 to 24, and b) 0 to 5 mol-% and preferably 0 to 1.25 mol-%, based on the sum of the aromatic dihalogen compounds corresponding to formula (I) and/or (II), of an aromatic trihalogen or tetrahalogen compound corresponding to formula (III)

 ArX$_n$ (III)

in which

Ar is an aromatic or heterocyclic radical containing 6 to 24 ring atoms; up to 3 ring C atoms may be replaced by hetero atoms, such as N, O, S, X represents halogen, such as bromine or chlorine, and n is the number 3 or 4, and 0 to 3 mol-% and preferably 0 to 1 mol-%, based on the sum of the aromatic dihalogen compounds corresponding to formula (I) and/or (II), of aromatic monohalogen compounds corresponding to formula (IV)

 R—Ar—X (IV)

in which

X represents halogen, such as bromine or chlorine, and Ar is as defined for formula (III), R is as defined for formula (I)

and c) 50 to 100 mol-% alkali metal sulfide, such as sodium or potassium sulfide, and 0 to 50 mol-% alkali metal hydrogen sulfide, such as sodium or potassium hydrogen sulfide, the molar ratio of (a+b): c being from 0.75:1 to 1.15:1 and preferably from 0.90:1 to 1.1:1, d) in an aprotic, polar organic solvent, but not N-methyl pyrrolidone, optionally using co-solvents, the molar ratio of c) to the organic solvent d) being from 1:3.4 to 1:1.0 and preferably from 1:2.6 to 1:1.3, characterized in that the reaction is carried out by mixing aqueous alkali metal sulfide and/or alkali metal hydrogen sulfide solutions with solutions of the aromatic dihalogen compounds in an organic solvent at temperatures above 212° C., the water content of the reaction solution does not exceed 0.02% by weight and unreacted aromatic halogen compounds corresponding to formulae (I), (II) and (III) are removed from the reaction mixture continuously or at the end of the reaction, the water-containing alkali metal sulfide and/or alkali metal hydrogen sulfide melts, optionally together with 0 to 3 mol (based on the sum of the aromatic dihalogen compounds corresponding to formula (I) and/or (II)) of chain-terminating aromatic monohydroxy compounds corresponding to formula (I)

HO—Ar—R$_2$ (V)

in which

Ar is as defined for formula (III), R$_2$ is H or a C$_{1-8}$ alkyl radical or may be a C$_6$H$_5$ aryl radical, —S—C$_6$H$_5$, —SO$_2$—C$_6$H$_5$ or

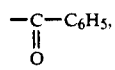

and the water-containing alkali metal sulfide and/or alkali metal hydrogen sulfide melt being introduced into the reaction mixture through a heated pipe and preferably through a heated nozzle, characterized in that, after the desired molecular weight of the polyarylene sulfide has been reached in the reaction mixture, an acid or an anhydride is added in the quantity 5 to 95% equivalent to the residual quantity of unreacted alkali metal sulfide and/or alkali metal hydrogen sulfide, after which the reaction mixture is worked up continuously or discontinuously.

Examples of aromatic dihalogen compounds of formula (I) suitable for use in accordance with the invention are 1,4-dichlorobenzene, 1,4-dibromobenzene, 1-bromo-4-chlorobenzene, 1,3-dichlorobenzene, 1,3-dibromobenzene, 1-bromo-3-chlorobenzene, 2,5-dichlorotoluene, 2,5-dichloroxylene, 1,4-dichloro-2-ethylbenzene, 1,4-dibromo-2-ethylbenzene, 1,4-dichloro-2,3,5,6-tetramethylbenzene, 1,4-dichloro-2-cyclohexylbenzene, 2-benzyl-1,4-dichlorobenzene, 2,4-dichlorotoluene, 2,4-dichloroxylene, 2,4-dichlorocumene, preferably 1,4-dichlorobenzene, 1,3-dichlorobenzene and 2,5-dichlorotoluene.

Examples of aromatic dihalogen compounds of formula (II) suitable for use in accordance with the invention are 4,4-dichlorodiphenyl, 4,4'-dibromodiphenyl, 4,4'-dichlorobenzophenone, 3,3'-dichlorobenzophenone, 4,4'-dichlorodiphenyl sulfone, 1,4-bis-(4'-chlorobenzoyl)-benzene, preferably 4,4'-dichlorodiphenyl, 4,4'-dichlorodiphenyl sulfone and 4,4'-dichlorobenzophenone.

The aromatic dihalogen compounds corresponding to formula (I) and/or (II) may be used individually or in admixture with one another.

Examples of aromatic trihalogen or tetrahalogen compounds of formula (III) suitable for use in accordance with the invention are 1,2,4-trichlorobenzene, 1,3,5-trichlorobenzene, 2,2',4,4'-tetracholorodiphenyl, 2,2',4,4'-tetrachlorodiphenyl sulfide, 1,3,5-trichlorotriazine, 1,2,6-trichloronaphthalene and tris-(4-chlorophenyl)-benzene.

Examples of chain-terminating aromatic monohalogen compounds of formula (IV) suitable for use in accordance with the invention are 4-chlorodiphenyl sulfide, 4-chlorodiphenyl, 4-chlorodiphenyl ketone, 4-chlorodiphenyl sulfone.

Examples of chain-terminating aromatic monohydroxy compounds corresponding to formula (V)

HO—Ar—R$_2$ (V)

where

Ar is as defined for formula (III), R$_2$ is H or a C$_{1-8}$ alkyl radical or may be a C$_6$H$_5$ aryl radical, —S—C$_6$H$_5$, —SO$_2$—C$_6$H$_5$

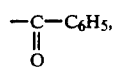

which may be introduced together with the alkali metal sulfide/hydrogen sulfide melt, are phenol, 4-hydroxydiphenyl and 4-hydroxydiphenyl sulfide.

The alkali metal sulfides are used in the usual quantities and in the usual way. For example, sodium and potassium sulfides prepared from the hydrogen sulfides with sodium or potassium hydroxide may be used. They contain 1 to 9 mol water per mol sulfide and are used in the form of a melt.

Suitable hydrogen sulfides are sodium or potassium hydrogen sulfides. They may be prepared from hydroxides and hydrogen sulfide. They may also be prepared from sulfides with hydrogen sulfide. They may contain 1 to 4 mol water.

Organic solvents suitable for the purposes of the invention are aprotic solvents, more particularly N-alkylated lactams, for example N-ethyl pyrrolidone, N-methyl piperidone, N-isopropyl pyrrolidone, N-methyl caprolactam, disubstituted cyclic ureas, for example N,N-dimethyl pyrimidazolidinone (also known as N,N-dimethyl propylene urea), N,N'-dimethyl imidazolidinone. The boiling point of the solvents is in the range from 212° to 280° C. and preferably in the range from 212° to 242° C. To reach these temperatures, the reaction may be carried out under a slight excess pressure (up to 10$^3$ mbar).

Suitable co-solvents are, for example, N-alkyl carboxylic acids or N,N-dialkyl carboxylic acid amides of C$_{1-8}$ aliphatic and C$_{6-12}$ aromatic carboxylic acids which may be used in a quantity of 0.02 to 18 mol-%, based on sulfide. Preferred co-solvents are N,N-dimethyl acetamide, N,N-diethyl acetamide, N,N-dimethyl propionamide or N-alkyl aminocarboxylic acids, such as for example N-methylamidocaproic acid.

Acids or anhydrides suitable for use in accordance with the invention are, for example, phosphoric acid, sulfuric acid, hydrochloric acid, acetic acid, adipic acid, phosphorous acid or sulfurous acid. Anhydrides suitable for use in accordance with the invention are, for example, acetanhydride and sulfur dioxide. Phosphoric acid, sulfuric acid, hydrochloric acid and acetic acid are particularly preferred.

The sulfur dioxide may optionally be saturated with steam and may be used at a temperature of 5° to 150° C. and under a steam partial pressure of 5 to 100 mbar.

In the preferred embodiment of the process according to the invention, the solvent, the aromatic halogen compounds corresponding to formulae (I) and (II) and/or (III) and (IV) may be initially introduced into the reactor, optionally with the co-solvents, and the water-containing hydrogen sulfides and/or sulfides, optionally in admixture with 0 to 3 mol-% (based on the sum of the aromatic dihalogen compounds corresponding to formula (I) and/or (II)) of chain-terminating aromatic monohydroxy compounds, such as phenol for example, are introduced simultaneously or successively into the reaction mixture through a heated pipe optionally provided with a heated nozzle. The temperature of the reaction mixture during the addition is above 200° C. Water is removed spontaneously with recycling of the aromatic halogen compounds of formulae (I), (II) and (III) which distill off azeotropically. The reaction mixture has a water content of 0 to 0.02% by weight.

The reaction time can vary from less than 1 hour to 35 hours. In a particularly preferred embodiment, it is between 2 and 25 hours. Unreacted aromatic halogen compounds corresponding to formulae (I), (II), (III) and (IV) are removed from the reaction mixture, for example by distillation.

To carry out the process according to the invention, an acid or anhydride is added in a quantity 5 to 95% equivalent to the residual content of alkali metal sulfide and/or alkali metal hydrogen sulfide in the reaction mixture, optionally in admixture with the aprotic solvent, after the desired molecular weight has been reached in the reaction mixture (as determined, for example, from a sample or using a continuous viscosity measuring probe). The acid or anhydride should be added at such a rate that the temperature of the reaction mixture does not fall below 200° C. and preferably does not fall below 220° C. The reaction mixture thus stabilized may be kept at the high temperature of >200° C. required for a long time without any reduction in molecular weight (i.e. with no change in the viscosity of the reaction mixture), so that it can be worked up continuously or discontinuously without any drastic reduction in molecular weight.

The polyarylene sulfides are isolated, for example, by cooling, filtration and washing of the reaction mixture with ketones, such as acetone, or alcohols, such as methanol, ethanol or isopropanol. The residue remaining is suspended in water in a ratio of 1 part residue to 5 to 20 parts water, the suspension obtained is adjusted to pH 1-7 with acids, such as for example acetic acid, hydrochloric acid, phosphoric acid, sulfuric acid, and subsequently washed with water. These process steps are preferably carried out continuously.

Another advantage of the process according to the invention in the subsequent working up of the polymer lies in the drastically reduced accumulation of hydrogen sulfide in the acidification phase of the working-up process, so that subsequent washing of the polymer with water is made easier.

The polyarylene sulfides thus produced have a narrow molecular weight distribution. This advantage is of particular value in discontinuous industrial production with polymer yields of several tonnes and residence times in the reactor during the working-up phase of several hours. In the event of plant malfunctions, the residence time can even be as long as several days.

The PAS thus produced contain less than 5 ppm inorganic chlorine. There is thus no need for the otherwise usual oxidative thermal aftertreatment and additional cleaning by extraction methods.

Determination of the melt viscosities of the polyarylene sulfides produced in accordance with the invention as a measure of their molecular weight is carried out at 310° C. in a high-pressure capillary viscosimeter in accordance with DIN 54 811 The melt viscosity at $\tau = 1,000$ sec.$^{-1}$ is selected as the reference value (cf. Table 1).

The molecular weight distribution is determined, for example, by high-temperature gel permeation chromatography of a 0.05% by weight solution of the polyarylene sulfide in N-methyl caprolactam at 185.C on columns of silica gel.

The non-uniformity U of a polymer is defined as the different between the quotient of the weight average molecular weight $M_w$ and the number average molecular weight $M_n$ and the number 1

$$U_1 = \frac{M_w}{M_n} - 1$$

The contents of inorganic chlorine in the polyarylene sulfides are determined, for example, by argentometric titration.

Other inorganic or organic oligomers or polymers, pigments and fillers, for example carbon black, graphite, metal powders, glass powder, silica flour, mica, glass and carbon fibers or fibers of other inorganic or organic materials, typical inorganic fillers from the group consisting of metal oxides or metal sulfates, and other additives, for example stabilizers and/or mold release agents, may be added to the polyarylene sulfides produced in accordance with the invention.

The polyarylene sulfides produced in accordance with the invention or blends thereof may be directly processed by extrusion, extrusion blow molding, injection molding or other typical molding techniques to form films, moldings or fibers. The products obtained may be used for the usual applications, for example as automobile parts, fittings, valves, ballbearing parts, electrical components, such as for example switches, electronic boards, parts resistant to chemicals and weathering and machine parts, such as pump housings and pump flywheels, etching pans, sealing rings, parts of office machinery, communications equipment, domestic appliances, etc.

The polymers produced by the process according to the invention are preferably used for the encapsulation of electronic components, such as for example transistors, diodes and microchips.

EXAMPLES

Example 1

In a 5 m$^3$ reactor, which is provided with a probe for on-line measurement of the viscosity of the reaction mixture, 1,920 kg (15.12 kmol) N-methyl caprolactam (NMC) and 1,199 kg (8.16 kmol) 1,4-dichlorobenzene are heated under nitrogen to 212° C. A melt heated to 130° C. of 812.3 kg (6.154 kmol) sodium sulfide trihydrate, 235.7 kg (2.946 kmol) 30% water-containing sodium hydrogen sulfide, 770 g (8.1 mol) phenol (=0.05 mol-%, based on 1,4-dichlorobenzene) and 292 kg (16.22 kmol) water is introduced over a period of 6.0 hours with stirring and with azeotropic removal of water from the reaction mixture at a temperature of the reaction mixture of 200° to 220° C.

The mixture added has a water content of 51.9%. The molar ratio of mols sulfur donor (6.154+2.946=9.1 kmol) to mols solvent (15.12 kmol) is 1:1.66. The molar ratio of mols dichlorobenzene to mols sodium sulfide and sodium hydrogen sulfide is 1:1.1157. The 1,4-dichlorobenzene azeotropically distilling off with the water is continuously returned to the reactor during addition of the sulfide. The reaction mixture is then refluxed for 4 hours, its temperature rising to 235° C. 70 kg NMC and 50 kg 1,4-dichlorobenzene are then distilled off and the reaction is continued with stirring for another 4 hours at 238° to 240° C./0.1 bar nitrogen excess pressure.

react for 8.5 hours at an internal temperature of 235° C./0.1 bar nitrogen excess pressure, samples are removed from the reaction mixture at 2-hourly intervals for analysis purposes, viscosity is measured and the reaction mixture is worked up as described in Example 1. Yield: 771 kg polyphenylene sulfide (=93.4%, based on dichlorobenzene). For comparative data, see Table 1.

TABLE 1

| Example | | Reactor viscosity reading 8 h after addition of $Na_2S$ (maximum) and before stabilization | Stabilization | | Molecular weight Mw and reactor viscosity reading $\eta$ at the following times after stabilization | | | | | Melt viscosity $\eta m$ of the worked-up polymer as measured in accordance with DIN 5411, (cf. page 8) high-pressure capillary viscosimetry, 310° C. |
|---|---|---|---|---|---|---|---|---|---|---|
| | | | | after: | 0 h | 2 h | 4 h | 6 h | 8 h | |
| 1 | = | 148 mPa.s | $H_3PO_4$ | $M_w =$ | 83400 | 83400 | 82100 | 82200 | 81800 | 280 Pa.s |
| | | | | = | 145 | 145 | 143 | 143 | 141 | |
| 2 | = | 142 mPa.s | $SO_2$ | $M_w =$ | 81300 | 81700 | 82000 | 81600 | 80900 | 278 Pa.s |
| | | | | = | 143 | 144 | 144 | 142 | 140 | |
| Comparison Example | = | 149 mPa.s | — | $M_w =$ | 83600 | 78600 | 62100 | 49500 | 41400 | 74 Pa.s |
| | | | | = | 149 | 132 | 118 | 87 | 72 | |

1) Determined by HPGPC (cf. page 10)

After viscosity measurement has indicated the desired value during the last hour, a sample is removed from the reactor for analysis and 38.3 kg 75% phosphoric acid (=293.4 mol) are subsequently introduced over a period of 30 minutes in admixture with 30 kg NMC. The $Na_2S$ content of the reaction mixture was 0.77% by weight before addition of the acid and 0.154% by weight after addition of the acid.

Samples were removed from the reaction mixture at 2-hourly intervals and were analyzed for molecular weight and melt viscosity. At the same time, the viscosity values of the reaction mixture were noted. The values are listed by way of comparison in Table 1.

8 Hours after addition of the acid, the reaction mixture is worked up as follows:

The reaction mixture is removed from the reactor, allowed to cool under nitrogen to 70° C., mixed with 1.4 tonnes (to) isopropanol with stirring, salt and polymer are filtered off and washed with 0.6 to isopropanol, the residue is suspended in 6 to water and the suspension is acidified to pH 2.5 with 78% sulfuric acid; the polymer is filtered off, washed with water until free from electrolyte and dried. Yield: 782 kg polyphenylene sulfide (=94.7%, based on dichlorobenzene).

Example 2

The procedure is as described in Example 1, except that, instead of 75% phosphoric acid, 17.83 kg $SO_2$ (=278.6 mol) are introduced into the reaction mixture over a period of 2 hours at a temperature of 40.C and under a steam partial pressure of 60 mbar. The internal reactor temperature does not exceed 230° C. The $Na_2S$ content of the reaction mixture was 0.65% by weight before addition of the $SO_2$ and 0.064% by weight after addition of the $SO_2$. The reaction mixture is worked up as described in Example 1. Yield: 781 kg polyphenylene sulfide (=94.6%, based on dichlorobenzene). For comparative data, see Table 1.

COMPARISON EXAMPLE 1

Example 1 is repeated, except that no acid or $SO_2$ is added after the desired viscosity value has been reached in the reaction mixture. The reaction mixture is left to

We claim:
1. A process for the molecular weight stabilization of linear or branches polyarylene sulfides, prepared by reaction of
a) one or more (hetero)aromatic dihalogen compounds corresponding to formula (I) or (II) or a mixture thereof,

(I)

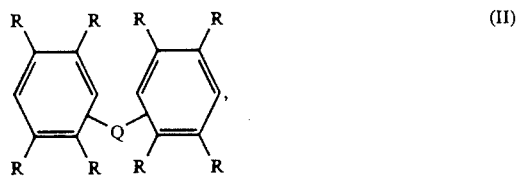

(II)

in which
X represents halogen,
the R's are the same or different and represent hydrogen, $C_{1-20}$ alkyl, $C_{4-20}$ cycloalkyl, $C_{6-24}$ aryl, $C_{7-24}$ alkylaryl and $C_{7-24}$ arylalkyl; two substituents R in the ortho position to one another are attached to form an aromatic or heterocyclic ring containing up to 3 hetero atoms,
and
Q is a chemical bond, or Q represents a two-bond group
and
b) 0 to 5 mol-%, based on the sum of the aromatic dihalogen compounds corresponding to formula (I) or (II) or a mixture thereof, of an aromatic trihalogen or tetrahalogen compound corresponding to formula (III)

$ArX_n$ (III)

in which

Ar is an aromatic or heterocyclic radical containing 6 to 24 ring atoms; up to 3 ring C atoms are replaced by hetero atoms, X represents halogen, and n is the number 3 or 4, and 0 to 3 mol-%, based on the sum of the aromatic dihalogen compounds corresponding to formula (I) or (II) or a mixture thereof, or aromatic monohalogen compounds corresponding to formula (IV)

$$R-Ar-X \quad\quad (IV)$$

in which

X represents halogen, and Ar is as defined for formula (III),

R is as defined for formula (I)

and c) 50-100 mol-% alkali metal sulfide, and 0 to 50 mol-% alkali metal hydrogen sulfide, the molar ratio of (a+b): c being from 0.75:1 to 1.15:1 d) in an aprotic, polar organic solvent, other than N-methyl pyrrolidone, with or without co-solvents, the molar ratio of c) to the organic solvent d) being from 1:3.4 to 1:1.0, comprising mixing aqueous alkali metal sulfide or alkali metal hydrogen sulfide or a mixture of alkali metal sulfide and alkali metal hydrogen sulfide solutions with solutions of the aromatic dihalogen compounds in an organic solvent at temperatures above 212° C., the water content of the reaction solution does not exceed 0.02% by weight and unreacted aromatic halogen compounds corresponding to formulae (I), (II) and (III) are removed from a reaction mixture continuously or at the end of the reaction, the water-containing alkali metal sulfide or alkali metal hydrogen sulfide or a mixture of alkali metal sulfide and alkali metal hydrogen sulfide melts, optionally together with 0 to 3 mol-% (based on the sum of the aromatic dihalogen compounds corresponding to formula (I) or (II) or a mixture thereof, of chain-terminating aromatic monohydroxy compounds corresponding to formula (V)

$$HO-Ar-R_2 \quad\quad (V)$$

in which

Ar is as defined for formula (III), $R_2$ is H or a $C_{1-8}$ alkyl radical or a $C_6H_5$ aryl radical, or $-S-C_6H_5$, or $-SO_2-C_6H_5$ or $$-\underset{\underset{O}{\|}}{C}-C_6H_5,$$

and the water-containing alkali metal sulfide or alkali metal hydrogen sulfide or a mixture of alkali metal sulfide and alkali metal hydrogen sulfide melt being introduced into the reaction mixture through a heated pipe characterized in that, after the desired molecular weight of the polyarylene sulfide has been reached in the reaction mixture, an acid or an acid anhydride is added in a quantity 5 to 95% equivalent to the residual quantity of unreacted alkali metal sulfide or alkali metal hydrogen sulfide or a mixture of alkali metal sulfide and alkali metal hydrogen sulfide, after which the reaction mixture is worked up continuously or discontinuously.

2. A process as claimed in claim 1, wherein the acid or acid anhydride is phosphoric acid.

3. A process as claimed in claim 1, wherein the acid or acid anhydride is sulfuric acid.

4. A process as claimed in claim 1, wherein the sulfur dioxide is saturated with steam at a temperature of 5° to 140° C. and under a steam partial pressure of 5 to 100 mbar.

5. A process as claimed in claim 1, wherein the acid is acetic acid or adipic acid or a mixture thereof.

6. A process as claimed in claim 1, wherein the solvent is N-methyl caprolactam.

7. A process as claimed in claim 1, wherein the aromatic dihalogen compounds of formula I are 1,4-dichlorobenzene, or 1,3-dichlorobenzene or 2,5-dichlorotoluene or mixtures thereof.

8. A process as claimed in claim 1, wherein the aromatic dihalogen compounds of formula II are 4,4'-dichlorodiphenyl, or 4,4'-dichlorodiphenyl sulfone or 4,4'-dichlorobenzophenone or mixtures thereof.

9. The process as claimed in claim 1, wherein the polyarylene sulfides are polyphenylene sulfides.

10. The process as claimed in claim 1, wherein X represents chlorine or bromine.

11. The process as claimed in claim 1, wherein Q represents a two-bond group selected from the group consisting of $-Ar-$, $-O-$, $-S-$, $-SO_2-$, $-(C_{r2})_m-$, $-CO-$, $-CO-Ar-CO-$, $-CO-NH-$, $-CO-NH-Ar-NH-CO-$.

12. The process as claimed in claim 1, wherein in formula (III) Ar is an aromatic or heterocyclic radical containing 6 to 24 ring atoms; up to three ring carbon atoms are replaced by heteroatoms selected from the group consisting of nitrogen, oxygen, and sulfur.

13. The process as claimed in claim 1, wherein the alkali metal sulfide as specified in c) is selected from the group consisting of sodium and potassium sulfide.

14. The process as claimed in claim 1, wherein the heated pipe is a heated nozzle.

15. The process as claimed in claim 1, wherein the alkali metal hydrogen sulfide is sodium or potassium hydrogen sulfide.

16. The process as claimed in claim 1, wherein the molar ratio of (a+b): c is from 0.90:1 to 1.1:1.

* * * * *